United States Patent [19]

Rowe

[11] Patent Number: 4,510,187
[45] Date of Patent: Apr. 9, 1985

[54] METHOD FOR CONDITIONING PHONOGRAPH RECORDS

[76] Inventor: Irwin Rowe, 4605 S. Balfour, Las Vegas, Nev. 89121

[21] Appl. No.: 607,586

[22] Filed: May 7, 1984

Related U.S. Application Data

[63] Continuation of Ser. No. 407,774, Aug. 13, 1982, abandoned, which is a continuation-in-part of Ser. No. 265,188, May 18, 1981, abandoned.

[51] Int. Cl.$^3$ .................. B05D 1/28; D06M 13/46
[52] U.S. Cl. .................................. 427/429; 252/8.8; 252/153; 427/428; 428/65
[58] Field of Search ............... 8/137; 252/8.75, 8.8, 252/89.1, 153, 547, DIG. 14; 260/DIG. 19, DIG. 20; 427/428, 429; 346/135.1, 137

[56] References Cited

U.S. PATENT DOCUMENTS

| | | | |
|---|---|---|---|
| 2,626,876 | 1/1953 | Carnes | 252/8.8 X |
| 2,897,170 | 7/1959 | Gruber | 427/393.1 X |
| 2,981,878 | 6/1959 | Chamberlain | 260/DIG. 20 |
| 3,117,113 | 1/1964 | Tudor | 252/8.75 X |
| 3,630,949 | 12/1971 | Brux et al. | 252/305 |
| 3,652,314 | 3/1972 | Castner | 428/65 |
| 3,951,841 | 4/1976 | Maier | 252/106 |
| 4,096,079 | 6/1978 | Pardee | 252/51.5 R |
| 4,129,505 | 12/1978 | Dasher et al. | 252/8.8 |
| 4,202,787 | 5/1980 | Davis | 252/171 |
| 4,232,072 | 11/1980 | Pardee | 428/65 |
| 4,313,978 | 2/1982 | Stevens et al. | 427/384 |
| 4,351,048 | 9/1982 | Berry | 369/288 |

FOREIGN PATENT DOCUMENTS

| | | |
|---|---|---|
| 30514 | 8/1972 | Japan . |
| 68980 | 6/1975 | Japan . |
| 820541 | 9/1959 | United Kingdom . |
| 849039 | 9/1960 | United Kingdom . |

OTHER PUBLICATIONS

Bennett, H., *The Chemical Formulary*, Chemical Publishing Co., N.Y., vol. XIV, 1968, p. 305 (Formula 1).

*Primary Examiner*—Prince E. Willis
*Attorney, Agent, or Firm*—Seiler, Quirk & Tratos

[57] ABSTRACT

A method of conditioning a phonograph record comprises applying a very thin film thereto of a quaternary ammonium salt having at least one long hydrocarbon chain. Preferred compositions have the formula

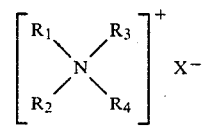

wherein $R_1$ is a hydrocarbon radical having from 8 to 22 carbon atoms, $R_2$ is a hydrocarbon radical having 8 to 22 carbons, $C_1$–$C_4$ alkyl, quaternary ammonium alkylene, or benzyl, and $R_3$ and $R_4$ are $C_1$–$C_4$ alkyl or -$(CH_2CH_2O)_n$H, wherein $n$ is an integer from 1 to 20, and X is a water-soluble salt-forming anion. Especially preferred compounds are quaternary ammonium compounds having at least one tallow radical. The compound is applied by spraying small quantities of a solution containing a minor amount of the salt dissolved in a solvent on a soft applicator, and pressing the applicator against the record while the surface is moving relative to the applicator.

6 Claims, No Drawings

METHOD FOR CONDITIONING PHONOGRAPH RECORDS

RELATIONSHIP TO OTHER APPLICATIONS

This application is a continuation of application Ser. No. 407,774, filed Aug. 13, 1982, which is a continuation-in-part of application Ser. No. 265,188, filed May 18, 1981, both abandoned.

BACKGROUND OF THE INVENTION

This invention relates to a method and compositions for conditioning phonograph records by application of a very thin film of certain quaternary ammonium compounds. In addition to cleaning and destaticizing the record, remarkable and measurable improvements in audio playback quality are achieved with some of these compounds.

The cleaning of phonograph record surfaces is a well-recognized and longstanding problem. While it is essential to remove dirt and other contaminants from very small grooves on the surface, even a slight scratching of the grooves can affect the reproduction quality. Known methods for cleaning a record surface include simple mechanical removal of dust with a brush or air jet stream, although these methods are generally not particularly effective if the dust is adhesive to the surface, whether by its own physical characteristics or with an electrostatic charge, or for inherently sticky substances, such as fingerprints. Rubbing of the surface with cleaners which may have abrasive contaminants is also dangerous to the integrity of the grooves. A somewhat more elaborate type of brush-operated cleaner is shown in Taylor, U.S. Pat. No. 3,150,401, wherein a record is rotated through a series of brushes, and strips of polonium impregnated material are located in the vicinity of the record to drain off static electricity.

Other types of record cleaners consist of hand-operated rollers, commonly wrapped with an adhesive material facing outward, such that as the roller traverses the record surface, dust deposited on the surface is picked up and retained by the roller. A device of this type is disclosed in U.S. Pat. No. 3,958,292. Another roller type cleaner is disclosed in Kawabe, U.S. Pat. No. 4,128,909.

While several of the known surface cleaning treatments are adequate to remove dust from the record surface, none of the known treatments has any appreciable effect on the actual sound reproduction qualities of the record. It has been found in accordance with the present invention that application of a very thin film of certain quaternary ammonium compounds to the record surface not only cleans the record and leaves it static free, but improves stylus life, and in some cases, remarkably enhances the aural qualities of the record. The quaternary ammonium compounds useful in the treatment of the invention are commonly used as fabric softeners, and generally have at least one hydrocarbon radical containing from 12 to 22 carbon atoms. The compounds imparting significantly improved aural qualities have at least one hydrocarbon radical having 14–18 carbon atoms, preferably derived from tallow.

Quaternary ammonium compounds are known antistatic components and have generically been disclosed as useful antistatic ingredients for phonograph record cleaners. For example, Pardee, U.S. Pat. No. 4,096,079 discloses "fatty quaternary ammonium compounds" to be useful antistatic agents. Similarly, Japanese patent 30514 discloses the use of trimethyl dodecylammonium chloride as an antistatic agent in an aqueous silicone-oil containing record cleaner. When used as antistatic agents, these compounds are present in extremely small amounts, e.g., about 0.01%w. Other disclosures of antistatic utility of these compounds is found in Friedman et al., U.S. Pat. No. 4,152,288, Dasher et al., U.S. Pat. No. 4,129,505, and Roche, Fr. No. 2,451,960.

Accordingly, it is an object of the present invention to provide a composition for application to a phonograph record surface which improves the aural qualities of the record in addition to cleaning and destaticizing the surface. It is a further object of the invention to provide a thin, long-lasting coating for a phonograph record that will subsist for a substantial number of plays before recoating is necessary. It is yet a further object of the invention to provide a method of application of a thin film of quaternary ammonium compound which permits the material to be applied with a very thin, even coating, to the record, without leaving any undue accumulations of material on the record.

BRIEF SUMMARY OF THE INVENTION

A conditioning solution for treatment of phonograph record surfaces comprises a minor amount of a quaternary ammonium compound having at least one hydrocarbon radical, containing from about 12 to about 22 carbon atoms, preferably from 16 to 18 carbon atoms, in a solvent therefor. Compounds having hydrocarbon radicals derived from tallow are especially preferred. A method of applying such solution to the record surface comprises applying, preferably by spraying, a small amount of liquid on an applicator pad, permitting the solvent to evaporate and pressing the pad against the surface of a rotating record.

DETAILED DESCRIPTION OF THE INVENTION

In its broad sense, the invention relates to the use of certain organic compounds to form a beneficial, very thin coating on the surface of a phonograph record. The compounds used are quaternary ammonium compounds which are commercially available and commonly used as fabric softeners. These compounds are dissolved in minor amounts, generally 0.5–5% by volume, preferably 1–3% by volume, of a suitable solvent.

Quaternary ammonium compounds useful in compositions of the invention have the following formula:

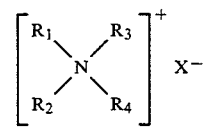

wherein $R_1$ is a hydrocarbon radical having from 8 to 22 carbon atoms, $R_2$ is a hydrocarbon radical having 8 to 22 carbons, $C_1$–$C_4$ alkyl, quaternary ammonium alkyl or alkenyl, or benzyl, and $R_3$ and $R_4$ are $C_1$–$C_4$ alkyl or —$(CH_2CH_2O)_nH$, wherein n is an integer from 1 to 20, and X is a water-soluble salt-forming anion. In the case in which $R_2$ is quaternary ammonium alkyl, the cation will have two positive charges, and two anions ($X^-$) will be necessary.

Examples of suitable compounds for use in the invention include dimethyl ditallow ammonium chloride, didodecyldimethyl ammonium chloride, tetradecyl-trimethyl ammonium chloride, ditetradecyldimethyl ammonium chloride, N,N,N$^1$,N$^1$,N$^1$-pentamethyl-N-tallow-1,3 propane diammonium dichloride, pentadecyltrimethyl ammonium chloride, dipentadecyldimethyl ammonium chloride, didodecyldiethyl ammonium chloride, didodecyldipropyl ammonium chloride, ditetradecyldiethyl ammonium chloride, ditetradecyldipropyl ammonium chloride, ditallowdiethyl ammonium chloride, ditallowdipropyl ammonium chloride, tallowdimethyl benzyl ammonium chloride, N,N,N$^1$,N$^1$,N$^1$-pentamethyl-N-coco-1,2 ethane diammonium dichloride, tallowdiethyl benzyl ammonium chloride, dodecyltrimethyl ammonium methyl sulfate, didodecyldiethyl ammonium acetate, tallowtrimethyl ammonium acetate, tallowdimethyl benzyl ammonium nitrite, ditallowdipropyl ammonium phosphate, ethoxylated distearyl dimethyl ammonium sulfate, trimethyl stearyl ammonium bromide, dicoco dimethyl ammonium sulfate, eicosyltrimethyl ammonium chloride.

In the above formula, R$_1$ and R$_2$ are preferably aliphatic, but may be aryl, alkaryl, or aralkyl. The anion X is preferably a halide, i.e., chloride, bromide, or ioide, but may be sulfate, acetate, hydroxide, methasulfate, or similar inorganic or organic solubilizing mono-or dibasic radicals. The term "tallow" refers to long chain aliphatic groups that are derived from tallow, being composed principally of hydrocarbon groups containing from 16 to 18 carbon atoms. The term "coco" refers to coconut oil derived radicals, generally containing from 8 to 18 carbon atoms, predominately 12 to 14 carbons.

For reasons which are not entirely understood, quaternary ammonium compounds having at least one tallow-derived hydrocarbon chain appear to be significantly superior to other quaternary ammonium compounds when used in compositions of the invention. In addition to cleaning and destaticizing the records, these compounds significantly enhance the aural qualities of the record. Specific compounds which have been found to impart improved listening qualities are trimethyltallow ammonium chloride, dimethyldi(hydrogenated-tallow)ammonium chloride, dimethylditallow ammonium chloride, N,N,N$^1$,N$^1$,N$^1$-pentamethyl-N-tallow-1,3-propane diammonium dichloride, and a mixture of equal amounts of trimethyl tallowammonium chloride with dimethyldicocoammonium chloride. These compounds are marketed by Armak Company, Industrial Chemicals Division, of Chicago, Ill., as Arquad T-50, Arquad 2HT-75, Arquad 2T-75, Arquad T-2C-50, and Duoquad T-50, respectively.

The term "tallow" as used to refer to a chemical substituent herein refers to a long-chain hydrocarbon radical derived from tallow, being composed primarily of hydrocarbon groups having 16–18 carbon atoms. The term "tallow quaternary ammonium salt" is used to refer to any quaternary ammonium salt having at least one tallow substituent. A typical analysis of the carbon chain in a "tallow" group in the commercial materials identified above is as follows:

| | |
|---|---|
| tetradecyl | 3.0% |
| pentadecyl | 0.5 |
| hexadecyl | 29.0 |
| heptadecyl | 1.0 |
| octadecyl | 20.0 |
| tetradecenyl | 0.5 |
| hexadecenyl | 2.0 |
| octadecenyl and | 44.0 |
| octadecadienyl | 100.0 |

Accordingly, the tallow groups consist principally of a mixture of C$_{16}$ and C$_{18}$ saturated and unsaturated hydrocarbon groups. While the term "tallow" generally refers to materials derived from animal fat (generally by digesting the fat with steam under pressure), essentially chemically equivalent mixtures from nonanimal sources would be expected to be operative for purposes of the invention. The tallow groups may be hydrogenated, as in Arquad 2HT-75; however, although these compounds seem to be effective (although not as effective as the non-hydrogenated materials) in improving aural qualities of the record, they are solid at ambient temperatures and are more difficult to formulate.

The reason for the remarkable effectiveness of these materials is not understood. It is postulated that the tallow-derived materials act as extreme-pressure agents, imparting high lubricity under the high pressure exerted at the stylus tip.

The quaternary ammonium compounds of the invention are dissolved in minor amounts in an appropriate solvent for application. In general, a relatively volatile organic solvent is preferred. Monoalkyl quaternaries are soluble in water, methanol, ethanol, isopropanol, carbon tetrachloride, and chloroform. Dialkyl quaternary salts are insoluble in water, but are soluble in benzenes, chloroform, carbon tetrachloride, methanol, ethanol, and isopropanol. Alkylbenzyl ammonium chlorides are soluble in water, acetone, alcohol, and most polar solvents. Ethoxylated quaternary salts are soluble in water, isopropanol, methanol, ethanol, acetone, benzene, carbon tetrachloride, hexylene glycol, and dioxane. Diquaternary salts are soluble in water, alcohols, carbon tetrachloride, and chloroform. By "minor amounts" is meant up to about 10% by volume, preferably 0.5%–5% by volume, and more preferably from about 1–3% by volume of quaternary ammonium salt, with the balance comprising solvent. In general, it is desired to have a solution which is nonviscous (i.e., viscosity similar to water) and which will not separate at ambient temperatures; concentrations may vary depending on the particular salt chosen. For example, hydrogenated salts, e.g. dimethyldi(hydrogenated-tallow)ammonium chloride, are solids at room temperature and will generally be used in somewhat lower concentrations. Simple mixtures of the salts and solvents are used; in some cases, it may be necessary to heat the components to facilitate solution.

The solvent performs no part in the final coating of quaternary ammonium compound, and serves merely as a vehicle to transport these compounds in non-viscous form and to permit even application of small amounts of those compounds on an applicator or on the record surface. Volatile solvents, particularly those which will evaporate completely in less than about 10 seconds, are preferred. Large quantities of solvents which may soften the record surface should of course be avoided.

It has also been found that a slight amount of water in an organic solvent appears to provide superior applicability of the solutions of the invention; for example, ethanol solutions containing 2–10% preferably 3–5% deionized water, are slightly superior to anhydrous ethanol.

The conditioning solution of the invention is preferably applied by means of a spray. The solution can be applied with a conventional hand pump sprayer bottle, or with an aerosol container equipped with a spray nozzle and a manually operable valve. The propellant used may be any conventional material, such as a fluorocarbon, lower hydrocarbon (e.g., propane or butane), or carbon dioxide. Carbon dioxide is particularly useful since it is non-flammable and non-toxic. A highly volatile propellant is preferred.

The method of application of the quarternary ammonium solution to the phonograph record surface is very important. While the solutions can be applied directly to the record, by spray or otherwise, it has been found that direct application can frequently result in undesirable accumulations of salt on the record, and, if a volatile solvent detrimental to the record surface is used, can cause permanent damage to the record. A very thin, uniform film of material, preferably no more than a few molecules thick, is particularly desirable.

The preferred method of application of quaternary ammonium salt to the record is as follows. First, a small amount (e.g., spray for 1-3 seconds) of solution is sprayed on a soft cloth or pad. The cloth or pad is then rubbed gently against a clean cloth or pad similar to the first one to assist in evaporating solvent and uniformly distributing the quaternary salt. Alternatively, the user should wait for about 10 seconds after the pad has been sprayed to permit the solvent to volatilize.

The record to be conditioned is then placed on a conventional turntable and is rotated at a relatively high speed, e.g., 45 or 78 r.p.m. If desired, the record can be rotated by hand. The treated cloth or pad is then pressed lightly against the record in a stationary position, with the record grooves passing therebeneath. This treatment is then applied to the entire surface of each side of the record, until the surface feels very slippery or smooth. This effect is very noticeable to the person applying the treatment. The record has a slightly shiny appearance indicating that the salt has been applied, although the record should not appear wet during treatment. This method of application provides a uniform, thin film on the surface. Use of this method is very important to effect uniform distribution since the active components of the spray are thick liquids or solids which tend not to distribute uniformly.

In addition to cleaning the surface of the record, lubricating the grooves, and removing static charges from the surface, the treatment of the invention has a consistent effect of improving the aural qualities of the record. Experts who have tested solutions of the invention indicate that surface noise is lower, and fidelity, particularly at high frequency range, is markedly improved. This effect is illustrated in the following example.

EXAMPLE

A solution of the invention was prepared by mixing dimethyl ditallow ammonium chloride, a brown liquid marketed by Armak Company under the trade name Arquad 2T-75, with ethanol and water to form the following solution.

|  | % vol. |
| --- | --- |
| Arquad 2T-75 | 1.4 |
| deionized water | 3.0 |
| ethanol | 95.6 |

This solution was packaged in an aerosol container with an isobutane propellant. Two short bursts of about 1 second each were applied to a soft velour pad, which was subsequently rubbed lightly against another like pad. The first pad was then lightly pressed against a record rotating at 45 rpm on a turntable, the treatment being applied to the entirety of each side. Tests using acoustical experts who listened to the record carefully before and after treatment indicate that the reproduction of sounds from the record were significantly superior after treatment. One expert stated that the treatment seemed to "take a mask off" of the record.

While the particular type of pad used to apply the salt is not critical, it should be soft, nonabrasive, and non-shedding. A particularly preferred applicator is a cosmetic-grade velour powder puff, which has been used with considerable success.

While the treatment according to the invention is not permanent, it will last for a substantial number of repeated playings. The number of playings between treatment will vary with frequency of play, humidity, type of stylus, tracking force, and other variables, but is frequently at least 10 separate uses.

I claim:

1. A method of conditioning the surface of a phonograph record which comprises applying thereto a film of a composition consisting essentially of dimethyl ditallow ammonium chloride.

2. The method of claim 1 wherein a solution of quaternary ammonium salt in a volatile solvent is applied to a soft, nonabrasive applicator, and the applicator is subsequently contacted with the record surface with relative movement therebetween.

3. The method of claim 2 wherein the solution is applied to the applicator by spraying a mist thereof on the applicator.

4. The method of claim 3 wherein the applicator on which mist has been sprayed is contacted with a soft, nonabrasive pad prior to contacting with the record surface.

5. The method of claim 2 wherein the record is placed on a turntable, the turntable is rotated, and the applicator is contacted with the record during rotation.

6. The method of claim 1 wherein the salt is applied in a solution having from about 0.5-5% vol. of quaternary ammonium salt, with the balance comprising a volatile solvent.

* * * * *